United States Patent
Huang et al.

(10) Patent No.: US 7,181,310 B2
(45) Date of Patent: Feb. 20, 2007

(54) AUTOMATIC TOOL LAYOUT APPARATUS AND METHOD

(75) Inventors: Kuo Jung Huang, Tu-chen (TW); Chung-Shan Cheng, Tu-Chen (TW); Zejun Dai, Shenzhen (CN); XiaoBing Gao, Shenzhen (CN); Jin Song Li, Shenzhen (CN); ZhiHui Wang, Shenzhen (CN); Wei Shao, Shenzhen (CN); Shengzhong Yi, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 281 days.

(21) Appl. No.: 10/894,603

(22) Filed: Jul. 19, 2004

(65) Prior Publication Data

US 2005/0015223 A1 Jan. 20, 2005

(30) Foreign Application Priority Data

Jul. 18, 2003 (TW) ................................ 92119709 A

(51) Int. Cl.
G06F 19/00 (2006.01)

(52) U.S. Cl. ........................................ 700/169; 700/179

(58) Field of Classification Search ................. 700/97, 700/169, 179, 180, 183
See application file for complete search history.

(56) References Cited

U.S. PATENT DOCUMENTS

| | | | | |
|---|---|---|---|---|
| 5,798,928 | A | * | 8/1998 | Niwa .......................... 700/180 |
| 6,532,783 | B2 | | 3/2003 | van Dalen et al. |
| 7,010,384 | B2 | * | 3/2006 | Lindstrom et al. .......... 700/169 |
| 2002/0139229 | A1 | * | 10/2002 | Yamamoto ...................... 83/39 |
| 2003/0038163 | A1 | * | 2/2003 | Foley et al. ............ 228/180.22 |

* cited by examiner

Primary Examiner—Albert W. Paladini
Assistant Examiner—Chad Rapp
(74) Attorney, Agent, or Firm—Wei Te Chung

(57) ABSTRACT

An apparatus (2) for automatically laying out punching tools on a turret is used in a computer-aided manufacturing system for sheet-metal punching. The system includes a server (1), a database (3), and client computers (7). The apparatus resides in the server, and is used for receiving drawings from the client computers to obtain information on workpieces, selecting punching tools in accordance with sizes and shapes of each type of drawing entity of the workpieces and in accordance with materials of the workpieces and machining allowances set by users, selecting a corresponding tool station on the turret for each of the selected punching tools in accordance with a type of the turret and specifications of the selected punching tool, mounting each punching tool on the corresponding tool station, selecting an optimum manufacturing path for each punching tool, and recording punching tool layout information. A related method is also provided.

20 Claims, 4 Drawing Sheets

AUTOMATIC TOOL LAYOUT APPARATUS AND METHOD

BACKGROUND OF THE INVENTION

1. Field of the Invention

The present invention relates to tool layout apparatuses and methods, and particularly to an automatic tool layout apparatus and method used in a computer-aided manufacturing system for sheet-metal punching.

2. Background of the Invention

With the ongoing globalization of commerce, market competition between modern international corporations is becoming more and more intense. All such manufacturing corporations have to try their best to improve their competitiveness. Improving production efficiency is a never-ending challenge. Improvements in machine punching tool hardware and falling commodity prices have helped increase many corporations' efficiency. Further, the use of computers to automate manufacturing has become popular, and has improved the speed and quality of sheet-metal punching. Sheet-metal punching at the present time mostly uses CAD (Computer Aided Design) to form 3-dimension models and define workpieces, and CAM (Computer Aided Manufacturing) to select an optimum manufacturing path for a punching tool.

There are two notable problems with automated sheet-metal punching at the present time: only experienced technicians are able to select an optimum punching tool for each type of drawing entity of workpieces, and to select an optimum manufacturing path for the punching tool; and database accessing is numerous and time-consuming when configuring a layout of the punching tools.

There is a need for an apparatus and method which can overcome the abovementioned problems of high labor intensity, human error, and limited production efficiency.

SUMMARY OF THE INVENTION

Accordingly, a main objective of the present invention is to provide an automatic tool layout apparatus and method, in which the automatic tool layout apparatus can receive drawings from client computers to obtain information on workpieces, select punching tools and corresponding tool stations for the punching tools, mount the punching tools in the corresponding tool stations, select an optimum manufacturing path for each of the punching tools, and record tool layout information.

To accomplish the above objective, an automatic tool layout apparatus (hereinafter "the apparatus") used in a computer-aided manufacturing system for sheet-metal punching (hereinafter "the system") is provided herein. The system includes a plurality of client computers, a database, and a server. The database stores information such as drawings from the client computers, punching tool information, turret information, tool layout information, and materials of workpieces and machining allowances set by users. The client computers can access the server via networks to view related tool layout information timely. The automatic tool layout apparatus resides in the server, and includes a drawing processing module, a condition maintaining module, a matching module, a searching module and a tool layout module.

The drawing processing module is used for receiving drawings from the client computers, obtaining information on workpieces from the drawings, and storing the drawings in the database. The condition maintaining module is used for calculating exact conditions and inexact conditions for each type of drawing entity of the workpieces. The matching module is used for examining whether any punching tool on a turret matches with at least one type of drawing entity according to the calculated exact conditions or inexact conditions of the type of drawing entity, and selecting the punching tool if it matches with the exact conditions or inexact conditions of at least one type of drawing entity. The searching module is used for searching the database for corresponding punching tool information if no punching tool on the turret matches with any one particular type of drawing entity. The tool layout module is used for selecting corresponding tool stations for selected punching tools according to a type of the turret and the specifications of the selected punching tools, mounting the selected punching tools in the corresponding tool stations, selecting an optimum manufacturing path (a machining sequence of a punching tool) for each of the selected punching tools, and recording tool layout information.

Further, the present invention provides an automatic tool layout method comprising the steps of: (a) receiving drawings from client computers to obtain information on workpieces; (b) selecting punching tools according to sizes and shapes of each type of drawing entity of the workpieces and according to materials of the workpieces and machining allowances set by users; (c) selecting corresponding tool stations according to a type of a corresponding turret and specifications of the selected punching tools, mounting the punching tools in the corresponding tool stations, and selecting an optimum manufacturing path for each of the punching tools; and (d) recording tool layout information.

Other objects, advantages and novel features of the present invention will be drawn from the following detailed description with reference to the attached drawings, in which:

DETAILED DESCRIPTION OF THE INVENTION

Figure 1:
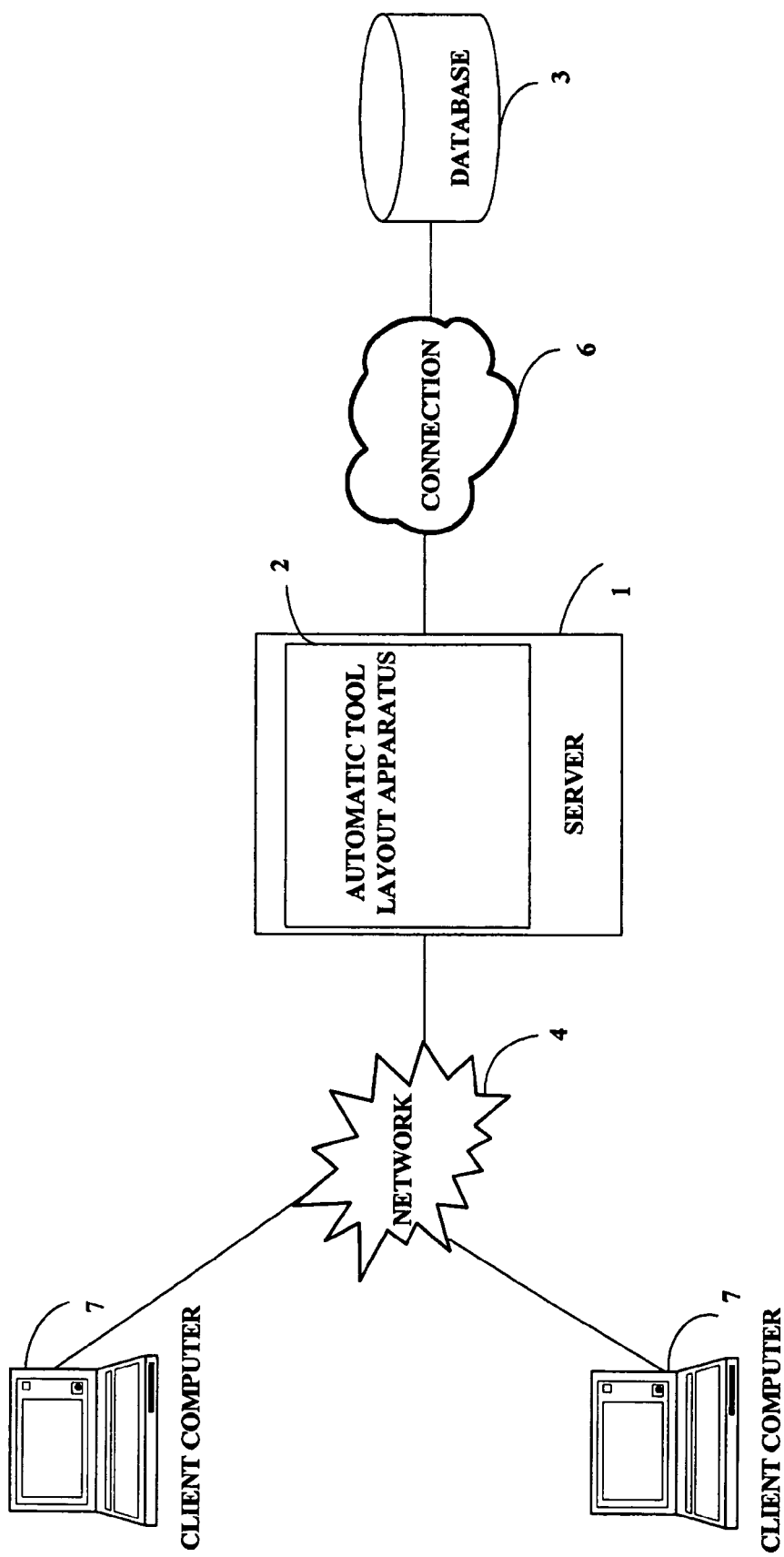
FIG. 1 is a schematic diagram of an application environment of an automatic tool layout apparatus according to the present invention.

FIG. 1 is a schematic diagram of an application environment of an automatic tool layout apparatus 2 (hereinafter "the apparatus") used in a computer-aided manufacturing system for sheet-metal punching (hereinafter "the system") according to the present invention. The system comprises a plurality of distributed client computers 7, a database 3, and a server 1. The client computers 7 are connected to the server 1 via a network 4, in order to obtain relevant tool layout information and to view the tool layout information timely. The network 4 may be any suitable communication architecture required by the system, such as a local area network or a wide area network. The server 1 is connected to the database 3 via a connection 6. The connection 6 is a database connectivity such as an Open Database Connectivity (ODBC) or a Java Database Connectivity (JDBC). The database 3 stores information such as drawings received from the client computers 7, punching tool information, turret information, tool layout information, materials of workpieces, and machining allowances set by users. The punching tool information includes specifications, types and parameters of punching tools. The turret information includes a type of each turret, and a size and location of each of tool stations an the turrets. The tool layout information includes locations of punching tools on each turret, and an optimum manufacturing path of each punching tool (a machining sequence of the punching tool). The automatic tool layout apparatus 2 resides in the server 1, and is used for: receiving drawings from the client computers 7 to obtain information on workpieces; selecting punching tools in accordance with sizes and shapes of each type of drawing entity of the workpieces and in accordance with materials and machining allowances set by users; selecting a corresponding tool station for each punching tool in accordance with a type of a turret and the punching tools specifications; mounting the punching tools in the corresponding tool stations; selecting an optimum manufacturing path for each punching tool; and recording tool layout information.

Figure 2:
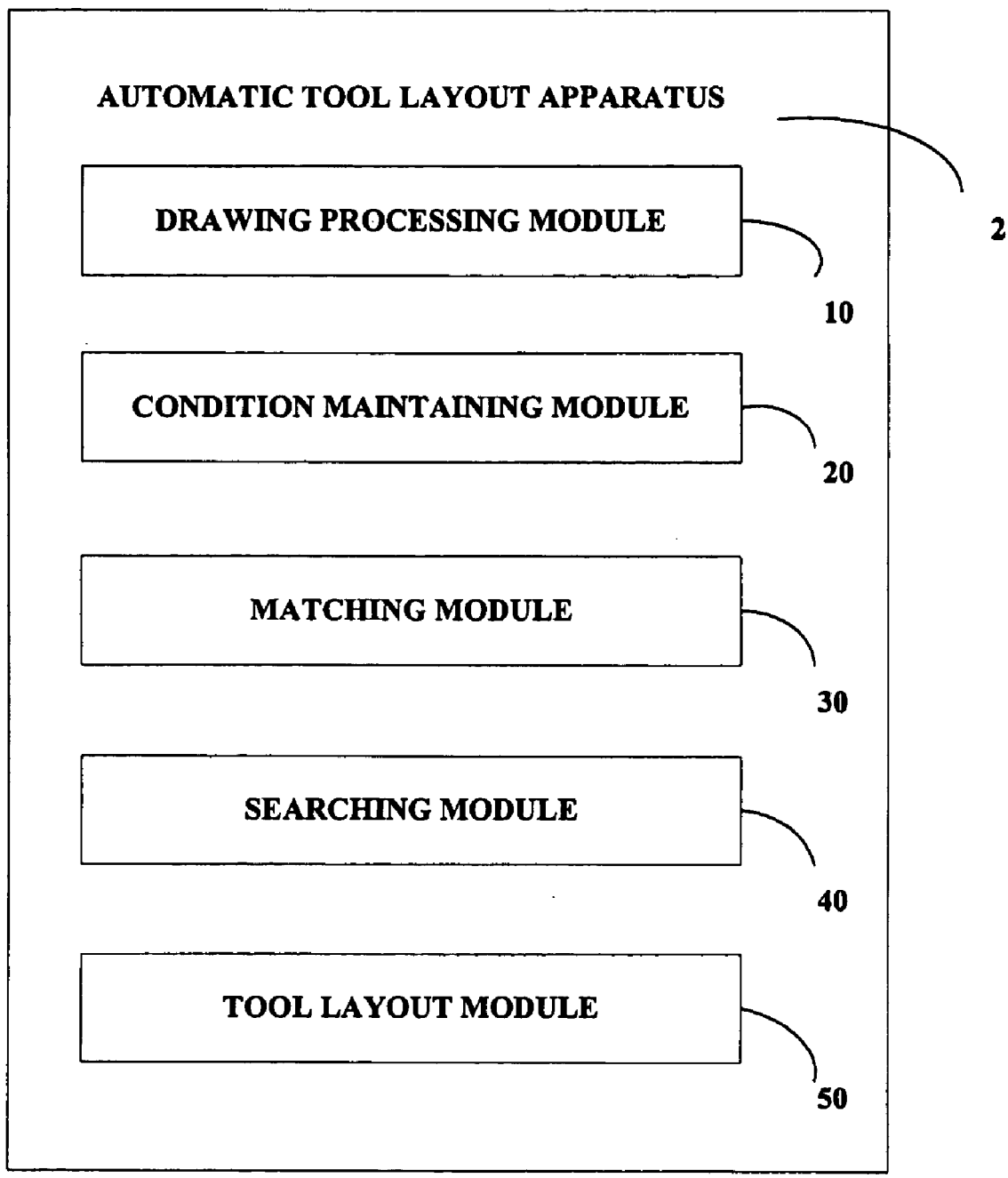
FIG. 2 is a schematic diagram of main function modules of the automatic tool layout apparatus of FIG. 1.

FIG. 2 is a schematic diagram of main function modules of the automatic tool layout apparatus 2. The automatic tool layout apparatus 2 includes a drawing processing module 10, a condition maintaining module 20, a matching module 30, a searching module 40, and a tool layout module 50. The drawing processing module 10 is used for receiving drawings from the client computers 7 via the network 4, obtaining information on workpieces from the drawings, and storing the drawings in the database 3. The condition maintaining module 20 is used for calculating exact conditions and inexact conditions for each type of drawing entity of the workpieces. The exact conditions are calculated according to shapes and sizes of the type of drawing entity. The inexact conditions are calculated according to materials of the workpieces and machining allowances set by users. The exact conditions calculated for each type of drawing entity comprise a radius, an including angle and an apex of the type of drawing entity. The inexact conditions calculated for each type of drawing entity comprise a rotational angle and a rotational direction of the type of drawing entity. The matching module 30 is used for examining whether any punching tool on a turret matches with at least one type of drawing entity according to the calculated exact conditions or inexact conditions of the type of drawing entity, and selecting the punching tool if it matches with the exact conditions or inexact conditions of at least one type of drawing entity. The searching module 40 is used far searching in the database 3 for corresponding punching tool information if no punching tool on the turret matches with any one particular type of drawing entity. The tool layout module 50 is used for selecting a corresponding tool station on the turret for each selected punching tool according to the type of the turret and the selected punching tool's specifications, mounting the punching tool in the corresponding tool station, selecting an optimum manufacturing path (a machining sequence of the punching tool) for the selected punching tool, and recording tool layout information.

Figure 3:
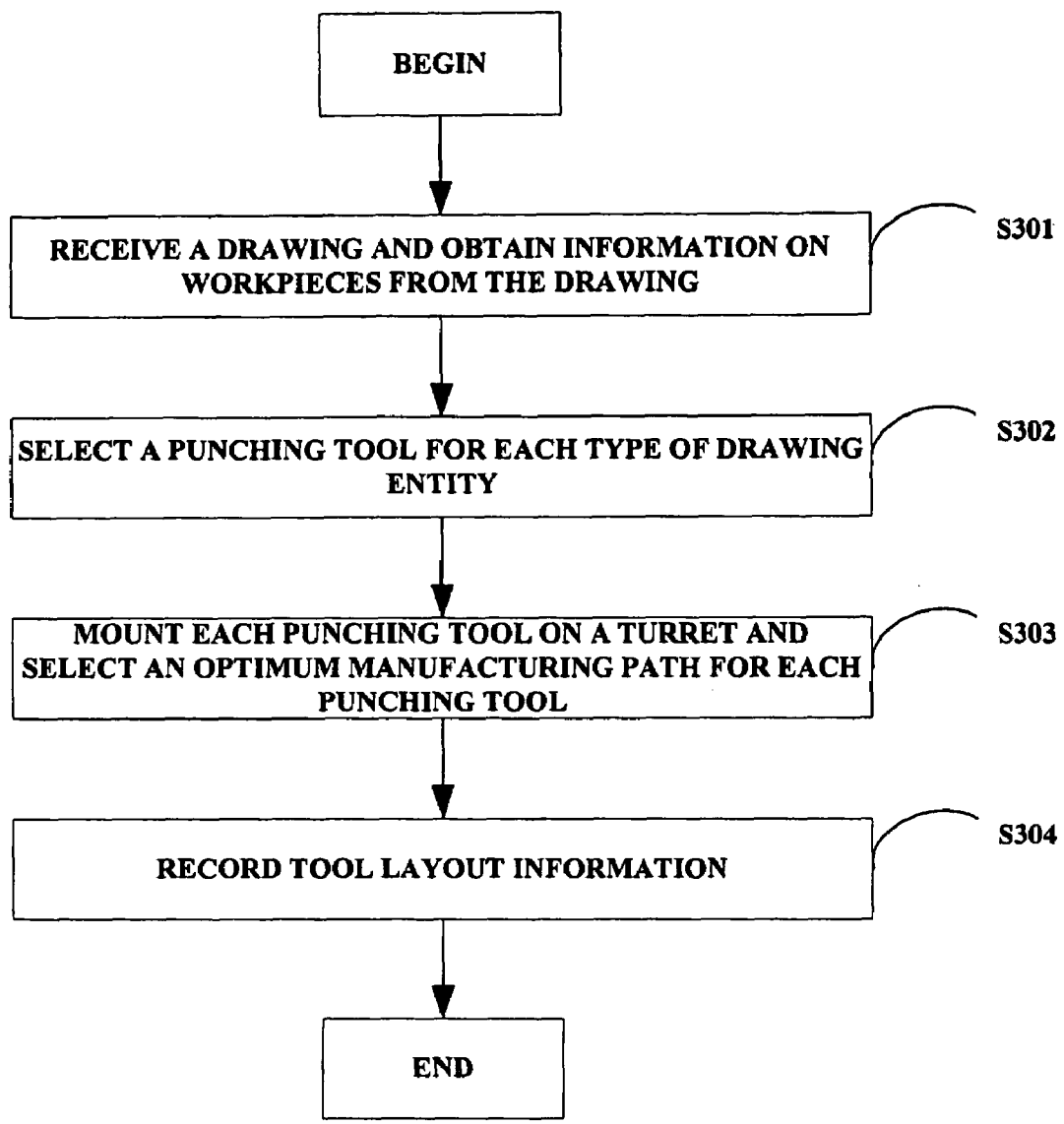
FIG. 3 is a flowchart of a preferred method for implementing the automatic tool layout apparatus.

FIG. 3 is a flowchart of a preferred method for implementing the automatic tool layout apparatus 2. In step S301, the drawing processing module 10 receives a drawing from a client computer 7, and obtains information on workpieces from the drawing. In step S302, the automatic tool layout apparatus 2 selects a punching tool for each type of drawing entity according to sizes and shapes of the type of drawing entity and according to materials of the workpieces and machining allowances set by users. (The procedure of selecting a punching tool for a type of drawing entity is described in detail below in relation to FIG. 4.) In step S303, the tool layout module 50 selects a corresponding tool station for each selected punching tool according to the type of a corresponding turret and specifications of the selected punching tool, mounts the selected punching tools in the corresponding tool stations, and selects an optimum manufacturing path for each of the punching tools. In the preferred embodiment of the present invention, drawing entities of the same type are machined using the same punching tool. Selecting an optimum manufacturing path for each punching tool means selecting a machining sequence for drawing entities of each same type using the same punching tool. In step S304, the tool layout module 50 records the tool layout information.

Figure 4:
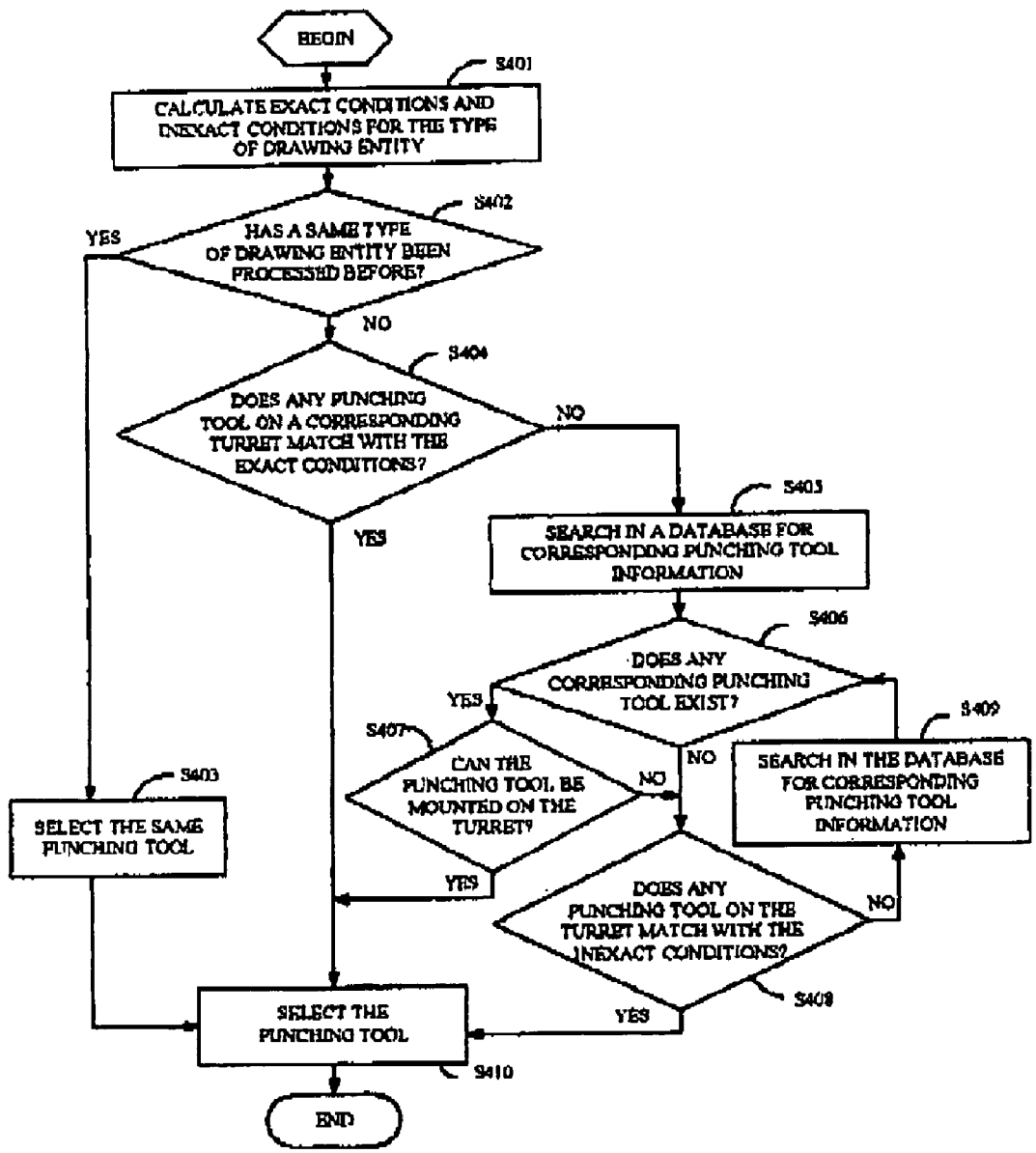
FIG. 4 is a flowchart of a preferred method for implementing one of steps of FIG. 3, namely selecting a punching tool for a type of drawing entity.

FIG. 4 is a flowchart of a preferred method for implementing step S302 of FIG. 3, namely selecting a punching tool for a type of drawing entity according to sizes and shapes of the type of drawing entity and according to materials of the workpieces and machining allowances set by users. In step S401, the condition maintaining module 20 calculates exact conditions for the type of drawing entity according to the shapes and the sizes of the type of drawing entity, and calculates inexact conditions according to the materials of the workpieces and machining allowances set by users. In step S402, the matching module 30 examines whether a same type of drawing entity has been processed before. If the same type of drawing entity has been processed before, in step S403, the matching module 30 selects the punching tool, that was previously used to machine the same type of drawing entity. If the type of drawing entity has not been processed before, in step S404, the matching module 30 examines whether any punching tool on a corresponding turret matches with the exact conditions of the type of drawing entity. If any punching tool on the turret matches with the exact conditions of the type of drawing entity, the procedure goes directly to step S410 described below. If no punching tool on the turret matches with the exact conditions of the type of drawing entity, in step S405, the searching module 40 searches in the database 3 for corresponding punching tool information that matches wit the exact conditions of the type of drawing entity. In step S406, the searching module 40 determines whether any corresponding punching tool exists according to searched punching tool information in the database 3. If any corresponding punching tool exists, in step S407, the matching module 30 determines whether the punching tool can be mounted on the turret according to specifications of the punching tool, a type of the turret, and sizes of tool stations on the turret. If the punching tool can be mounted on the turret, the procedure goes directly to step S410 described below. If no corresponding punching tool exists according to searched punching tool information in the database 3, or if the punching tool cannot be mounted on the turret, in step S408, the matching module 30 examines whether any punching tool on the turret matches with the inexact conditions of the type of drawing entity. If any punching tool on the turret matches with the inexact conditions of the type of drawing entity, the procedure goes to step S410 described below. If no punching tool on the turret matches with the inexact conditions of the type of drawing entity, in step S409, the searching module 40 searches in the database 3 for corresponding punching tool information that matches with the inexact conditions of the type of drawing entity, whereupon the procedure returns to step S406 described above. In step S410, the matching module 30 selects the punching tool.

What is claimed is:

1. An automatic tool layout apparatus, comprising:
   a drawing processing module for receiving one or more drawings from one or more client computers, and for obtaining information on workpieces from the drawings;
   a condition maintaining module for calculating exact conditions according to sizes and shapes of each type of drawing entity of the workpieces, and for calculating inexact conditions according to materials of the workpieces and machining allowances set by users;
   a matching module for selecting punching tools for each type of drawing entity according to the exact conditions or the inexact conditions of the type of drawing entity;
   a searching module for searching for punching tool information in a database according to the exact conditions or the inexact conditions of the type of drawing entity when no punching tool on a corresponding turret matches the type of drawing entity; and
   a tool layout module for selecting a corresponding tool station on the turret for each selected punching tool according to a type of the turret and specifications of the punching tool, mounting the punching tool in the corresponding tool station on the turret, and selecting an optimum manufacturing path for the punching tool.

2. The automatic tool layout apparatus according to claim 1, wherein the automatic tool layout apparatus is adapted for use in a computer-aided system for sheet-metal punching.

3. The automatic tool layout apparatus according to claim 1, wherein the client computers are connected to the automatic tool layout apparatus via a network.

4. The automatic tool layout apparatus according to claim 1, wherein the automatic tool layout apparatus is connected to the database via a connection.

5. The automatic tool layout apparatus according to claim 1, wherein the matching module is also for examining whether a same type of drawing entity has been processed before, and selecting a punching tool which was previously used to machine the same type of drawing entity when the same type of drawing entity has been processed before.

6. An automatic tool layout method, comprising;
   receiving one or more drawings from a client computer and obtaining information on workpieces from the drawings;
   selecting a punching tool for each type of drawing entity of the workpieces according to sizes and shapes of the type of drawing entity and according to materials of the workpieces and machining allowances set by users;
   selecting a corresponding tool station on a turret for each selected punching tool according to specifications of the punching tool and a type of the turret; and
   mounting each punching tool on the corresponding tool station of the turret, and selecting an optimum manufacturing path for each punching tool.

7. The automatic tool layout method according to claim 6, wherein selecting a punching tool for each type of drawing entity further comprises calculating exact conditions according to the sizes and the shapes of the type of drawing entity, and calculating inexact conditions according to the materials of the workpieces and the machining allowances set by the users.

8. The automatic tool layout method according to claim 7, wherein selecting a punching tool for each type of drawing entity further comprises determining whether the type of drawing entity has been processed before.

9. The automatic tool layout method according to claim 8, wherein selecting a punching tool for each type of drawing entity further comprises selecting a punching tool which was previously used to machine the typo of drawing entity if the type of drawing entity has been processed before.

10. The automatic tool layout method according to claim 8, wherein selecting a punching tool for each type of drawing entity further comprises determining whether any punching tool on the turret matches the exact conditions of the drawing entity if the type of drawing entity has not been processed before.

11. The automatic tool layout method according to claim 10, wherein selecting a punching tool for each type of drawing entity further comprises selecting a punching tool on the turret if the punching tool matches the exact conditions of the type of drawing entity.

12. The automatic tool layout method according to claim 10, wherein selecting a punching tool for each type of drawing entity further comprises searching in a database for punching tool information that matches the exact conditions of the type of drawing entity if no punching tool on the turret matches the exact conditions of the type of drawing entity.

13. The automatic tool layout method according to claim 12, wherein selecting a punching tool for each type of drawing entity further comprises determining whether any punching tool exists that matches the exact conditions according to searched punching tool information.

14. The automatic tool layout method according to claim 13, wherein selecting a punching tool for each type of drawing entity further comprises determining whether the punching tool can be mounted on the turret if a punching tool exists that matches the exact conditions.

15. The automatic tool layout method according to claim 14, wherein selecting a punching tool for each type of drawing entity further comprises selecting the punching tool if the punching tool can be mounted on the turret.

16. The automatic tool layout method according to claim 14, wherein selecting a punching tool for each type of drawing entity further comprises determining whether any punching tool on the turret matches the inexact conditions of the type of drawing entity if the punching tool cannot be mounted on the turret.

17. The automatic tool layout method according to claim 16, wherein selecting a punching tool for each type of drawing entity further comprises selecting the punching tool if the punching tool matches the inexact conditions.

18. The automatic tool layout method according to claim 13, wherein selecting a punching tool for each type of drawing entity further comprises determining whether any punching tool on the turret matches the inexact conditions of the type of drawing entity if no punching toot exists that matches the exact conditions.

19. The automatic tool layout method according to claim 18, wherein selecting a punching tool for each type of drawing entity further comprises searching in the database for punching tool information that matches the inexact conditions if no punching tool on the turret matches the inexact conditions.

20. The automatic tool layout method according to claim 6, further comprising recording tool layout information.

* * * * *